United States Patent
Garahi et al.

(10) Patent No.: US 7,206,294 B2
(45) Date of Patent: Apr. 17, 2007

(54) MOVABLE ACCESS POINTS AND REPEATERS FOR MINIMIZING COVERAGE AND CAPACITY CONSTRAINTS IN A WIRELESS COMMUNICATIONS NETWORK AND A METHOD FOR USING THE SAME

(75) Inventors: Masood Garahi, Loveland, CO (US); Peter J. Stanforth, Winter Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 132 days.

(21) Appl. No.: 09/929,030

(22) Filed: Aug. 15, 2001

(65) Prior Publication Data

US 2003/0091010 A1    May 15, 2003

(51) Int. Cl.
*H04B 7/14* (2006.01)
*H04J 1/10* (2006.01)
*H04J 3/08* (2006.01)

(52) U.S. Cl. ...................... 370/315; 455/11.1

(58) Field of Classification Search ............ 370/310.2, 370/313–315, 327, 338, 328, 331, 340, 348–349, 370/334; 455/466, 11.1, 561, 446, 449, 447; 342/357.09, 357.12, 357.06
See application file for complete search history.

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | |

(Continued)

FOREIGN PATENT DOCUMENTS

CA    2132180    3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Chi Pham
*Assistant Examiner*—Ronald Abelson
(74) *Attorney, Agent, or Firm*—Randi L. Karpinia; Joseph J. Buczynski

(57) ABSTRACT

A system and method for improving the ability of a wireless communications network, such as a packet-switched data communications network, to provide service to mobile user terminals. The system and method employs a mobile access point, adapted for use with the packet-switched communications network comprising at least one fixed access point, to provide a mobile wireless user terminal with access to the network, and a method for using the same. The mobile access point comprises at least one transceiver, which can be mounted to a mobile vehicle and receive substantially constant power from the vehicle, and which is adapted to transmit and receive communications signals to and from the wireless user terminal, and to operate as a communications link between the wireless user terminal and the fixed access point, to provide the wireless user terminal with access to the network via the communications link. The transceiver is further adapted to provide a second communications link between the user terminal an another user terminal, or between the mobile access point and another mobile access point of the network. The mobile access point further includes technology, such as global positioning system (GPS) technology, which adapted to determine a geographic location of the mobile access point.

24 Claims, 5 Drawing Sheets

U.S. PATENT DOCUMENTS

| | | | |
|---|---|---|---|
| 4,736,371 A | 4/1988 | Tejima et al. | |
| 4,742,357 A | 5/1988 | Rackley | 342/457 |
| 4,747,130 A | 5/1988 | Ho | 379/269 |
| 4,873,711 A * | 10/1989 | Roberts et al. | 455/412.2 |
| 4,876,710 A * | 10/1989 | Reed et al. | 455/404.1 |
| 4,910,521 A | 3/1990 | Mellon | 342/45 |
| 4,972,455 A * | 11/1990 | Phillips et al. | 455/552.1 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | |
| 5,241,542 A | 8/1993 | Natarajan et al. | |
| 5,317,566 A | 5/1994 | Joshi | |
| 5,392,450 A | 2/1995 | Nossen | 455/12.1 |
| 5,412,654 A | 5/1995 | Perkins | |
| 5,424,747 A | 6/1995 | Chazelas | 342/70 |
| 5,502,722 A | 3/1996 | Fulghum | 370/69.1 |
| 5,517,491 A | 5/1996 | Nanni et al. | |
| 5,555,425 A | 9/1996 | Zeller et al. | 395/800 |
| 5,555,540 A | 9/1996 | Radke | |
| 5,572,528 A | 11/1996 | Shuen | |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,771,468 A * | 6/1998 | Stein | 455/561 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/349 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,857,144 A * | 1/1999 | Mangum et al. | 455/11.1 |
| 5,870,350 A | 2/1999 | Bertin et al. | 365/233 |
| 5,872,773 A * | 2/1999 | Katzela et al. | 370/256 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,067,297 A | 5/2000 | Beach | |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,141,533 A * | 10/2000 | Wilson et al. | 455/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,222,463 B1 | 4/2001 | Rai | 340/928 |
| 6,222,504 B1 | 4/2001 | Oby | 343/892 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,317,453 B1 * | 11/2001 | Chang | 375/140 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,359,872 B1 | 3/2002 | Mahany et al. | |
| 6,366,568 B1 | 4/2002 | Bolgiano et al. | |
| 6,373,430 B1 * | 4/2002 | Beason et al. | 342/357.09 |
| 6,405,049 B2 | 6/2002 | Herrod et al. | |
| 6,442,398 B1 * | 8/2002 | Padovani et al. | 455/522 |
| 6,459,881 B1 * | 10/2002 | Hoder et al. | 455/11.1 |
| 6,839,356 B2 * | 1/2005 | Barany et al. | 370/401 |
| 2001/0053699 A1 | 12/2001 | McCrady et al. | 455/513 |
| 2002/0070881 A1* | 6/2002 | Marcarelli et al. | 340/988 |
| 2002/0118663 A1* | 8/2002 | Dorenbosch et al. | 370/338 |

FOREIGN PATENT DOCUMENTS

| | | |
|---|---|---|
| EP | 0 482 503 A2 | 4/1992 |
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 96/39002 A | 12/1996 |
| WO | WO 9724005 | 7/1997 |
| WO | WO 98/28865 A | 7/1998 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

"OSPF Version 2", Apr. 1998, Internet RFC/STD/FYI/BCP Archives.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

MOVABLE ACCESS POINTS AND REPEATERS FOR MINIMIZING COVERAGE AND CAPACITY CONSTRAINTS IN A WIRELESS COMMUNICATIONS NETWORK AND A METHOD FOR USING THE SAME

BACKGROUND OF THE INVENTION

1. Field of the Invention

The present invention relates to movable access points and repeaters in a wireless communications network for minimizing coverage and capacity constraints in the network. More particularly, the present invention relates to constantly moveable access points of a core network of an ad-hoc wireless packet-switched data communications network, which provide user terminals with access to the core network and also are capable of functioning as repeaters between user terminals to enhance the self healing capabilities of the ad-hoc network.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells".

Specifically, a terrestrial cellular network or other type of conventional specialized mobile radio (SMR) system includes a plurality of interconnected stationary base stations that are distributed geographically at designated locations throughout the service area. Each stationary base station includes one or more transceivers that are capable of transmitting and receiving electromagnetic signals, such as radio frequency (RF) communications signals, to and from user terminals, such as wireless telephones, located in its coverage area. The communications signals include, for example, voice data that has been modulated according to a desired modulation technique and transmitted as data packets. As can be appreciated by one skilled in the art, the transceiver and user terminals transmit and receive the data packets in multiplexed format, such as time-division multiple access (TDMA) format, code-division multiple access (CDMA) format, or frequency-division multiple access (FDMA) format, which enables a single transceiver at the base station to communicate simultaneously with several user terminals in its coverage area.

Each base station is also connected to one or more gateways that enable communication between the base station and other networks, such as the Internet and the public switched telephone network (PSTN). Accordingly, the base stations in the network enable the user terminals to communicate with each other, as well as with other destinations, such as telephony devices, in the PSTN.

Because each base station is stationary and can only handle a limited amount of communications signal traffic from the user terminals at any given time, the coverage area of a base station can vary depending on the amount of traffic that the base station is expected to experience. For example, the coverage area of a base station can be set to several miles in diameter in sparsely populated regions, such as rural regions having light wireless traffic, and can be set to less than a mile in diameter in densely populated regions, such as major metropolitan areas having heavy wireless traffic. The wireless communications network therefore must employ many stationary base stations in heavily populated metropolitan areas in order for the network to adequately service the user terminals in those regions.

The problem of providing an adequate number of base stations for a region is also exacerbated in areas where heavy commuting traffic occurs. For example, in metropolitan areas, millions of commuters may travel on specific stretches of highways during the morning and evening rush hour periods. However, at all other times of the day and on weekends, these stretches of highway may receive only a modest amount of traffic. Accordingly, it is impractical to deploy numerous base stations in these commuting areas simply to accommodate the few hours of increased activity per weekday. The number of base stations that can be deployed may also be limited due to space and zoning constraints. Hence, due to the lack of adequate base stations in these commuting areas, the network may be incapable of adequately servicing its subscribers during these busy commuting hours of the workday.

Other variables, such as the distance between a user terminal and a base station it is trying to access, interference in the base station's coverage area, the existence of structures such as buildings which block the line of sight (LOS) path between a user terminal and a base station, as well as regulatory and site restrictions, also create holes in the coverage areas which adversely affect the capacity capabilities of the network. Users become aware of such holes because they either lose service or get very poor service in a particular location. In certain instances, in order for a user terminal to greatly improve its service, the user terminal may need only move a few feet, for example, from behind a building blocking the user terminal's LOS with a base station to a position in the network that has adequate coverage and capacity capabilities.

Attempts to improve the coverage area provided by a base station include providing a rotating antenna at the fixed base station site. U.S. Pat. No. 6,222,504, incorporated herein by reference, discloses techniques for reorienting an antenna of a fixed base station. Although this solution may somewhat enhance the ability of a base station to service its coverage area, the coverage area itself remains fixed because the base station remains fixed. Another solution can be to make the base station towers mobile by making them airborne, such as on aircraft or on movable tracks. However, these solutions are difficult to deploy because of the size, cost and complexity of traditional base station equipment.

As can be further appreciated by one skilled in the art, it is also common for a mobile user terminal to travel between different base station coverage areas during use, that is, during a single telephone call. When this occurs, the base station whose coverage area the user terminal is leaving must transfer or "handoff" the user terminal to the base station whose coverage area the user terminal is entering, so that the latter base station can become the base station via which the user terminal and network continue to communicate. In densely populated areas having many base stations with small coverage areas, this handoff process may need to occur several times during a short period of time as the user terminal travels between the different coverage areas. However, in regions such as high traffic commuting regions having an inadequate number of base stations, more user terminals are competing for access to a base station within their coverage area. Accordingly, the number of lost or dropped calls that may occur during the handoff process can be increased due to the lack of adequate base station accessibility.

Many techniques have been developed using the circuit-switched cellular infrastructure to minimize data packet loss during handoff while also minimizing overhead necessary to successfully perform the handoff. For example, a technique known as "hard handoff" refers to a break-before-make technique where the original connection is dropped before the new connection is established. On the other hand, "soft handoff" is a make-before-break technique that maintains multiple simultaneous connections to the user terminal during handoff, and only drops the original connection after the new connection is established. Examples of soft handoff techniques are described in a publication by Wong et al. entitled "Soft Handoffs in CDMA Mobile Systems", IEEE Personal Communications, December 1997, pp. 6–17, in a publication by Wong et al. entitled "A Pattern Recognition System for Handoff Algorithms", IEEE Journal on Selected Areas in Communications, Vol. 18, No. 7, July 2000, pp. 1301–1312, and in TIA document TIA/EIA-95-B entitled "Mobile Station-Base Station Compatibility Standard for Wideband Spread Spectrum Cellular Systems", Feb. 1, 1999, the entire contents of each of these documents being incorporated herein by reference.

With the arrival of the Internet in recent years, some wireless communications networks have moved away from the use of conventional cellular networks and their associated circuit switched routing techniques to improve voice communications services. Each mobile user terminal, telephony device, and any other device capable of communicating with the communications network, has a unique Internet Protocol (IP) address that uniquely identifies it from all other devices. A communications network employing IP sends data between destination points in digital form in discrete packets, rather than in the traditional circuit-committed protocols of the PSTN. Each of the data packets includes the sender's IP address as well as the intended receiver's IP address.

When a wireless user terminal, for example, transmits voice data to a base station of the communications network acting as the access point for the user terminal, a router associated with the base station reads the receiver IP address in the data packet. Each router includes a table of routing information, such as IP addresses of the devices local to the router, available routes, and so on. If the router recognizes from the receiver IP address that the data packet is intended for a telephony device in its immediate neighborhood or domain, the router forwards the data packet to that telephony device. However, if the router does not recognize the IP address as belonging to such a telephony device, the router forwards the data packet to an appropriate adjacent gateway in, for example, the Internet. The router of that gateway then reads the receiver IP address in the data packet, and either delivers the data packet to the appropriate telephony device in its domain, or forwards the data packet to another gateway. Once a router in a gateway recognizes the receiver IP address as belonging to a telephony device in its domain, the router in that gateway delivers the data packet to that telephony device.

It can be also noted that the use of IP to route data packets in a communications network enables the network to handle data other than voice data. For example, such IP techniques can be used to expand the versatility of the network to communicate audio, video or multimedia data between user terminals. Such networks can be configured as packet-switched data networks, as opposed to traditional circuit switched networks. A communications network employing a packet-switched core network is described, for example, in U.S. patent No. 7,072,650 entitled "Ad Hoc Peer-to-Peer Mobile Radio Access System Interfaced to the PSTN and Cellular Networks", issued on Jul. 4, 2006, the entire content of which is incorporated herein by reference. An example of a wireless local area network (LAN) having mobility is set forth in IEEE Standard 802.11, Aug. 20, 1999, the entire content of which is incorporated herein by reference.

As in traditional cellular communications networks, wireless user terminals in a wireless communications network employing IP can be mobile, and can thus periodically change their access point to the network. Also, wireless user terminals can move outside their "home" network and become temporarily affiliated with a foreign network, and thus communicate via an access point on that foreign network.

Hence, as with traditional cellular communications networks, similar problems can arise in these packet-switched data networks which service mobile user terminals. That is, these types of networks can also experience an increased occurrence of dropped or lost data communications for mobile user terminals, and the inability of mobile user terminals to adequately access the network, if the number of access points deployed in high traffic areas is inadequate. U.S. Pat. No. 6,222,463, incorporated herein by reference, discloses a device that can be placed in vehicles to provide information about the vehicle to fixed roadside base stations to enable the base stations to track the vehicles. However, this patent does not provide any suitable solution for eliminating the problems discussed above relating to holes in the coverage areas of traditional cellular networks or packet-switched data networks. Accordingly, a need exists for a packet-switched data network having improved coverage and capacity capabilities, and a minimal amount of holes in its coverage area.

SUMMARY OF THE INVENTION

An object of the present invention is to provide a system and method for improving the ability of a wireless communications network, such as a packet-switched data communications network, to provide service to mobile user terminals.

Another object of the present invention is to provide mobile access points for a wireless communications network, in particular, a packet-switched data communications network, to minimize the amount of holes in the coverage areas of the network to thus improve service to mobile user terminals accessing the network.

These and other objects of the present invention are substantially achieved by providing a mobile access point, adapted for use with a packet-switched communications network comprising at least one fixed access point, to provide a mobile wireless user terminal with access to the network, and a method for using the same. The mobile access point comprises at least one transceiver, which adapted to transmit and receive communications signals to and from the wireless user terminal, and to operate as a communications link between the wireless user terminal and the fixed access point, to provide the wireless user terminal with access to the network via the communications link, and which is housed in a structure that is adapted to mount on or in a mobile vehicle. The mobile access point further includes a power connection, that is adapted to couple to a substantially constant power supply, such as the power supply of the mobile vehicle, to provide substantially constant power to the transceiver. The transceiver is further adapted to provide a second communications link between the user terminal an another user terminal, or between the mobile access point and another mobile access point of the network. The mobile access point further includes technology, such as global positioning system (GPS) technology, which adapted to determine a geographic location of the mobile access point.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
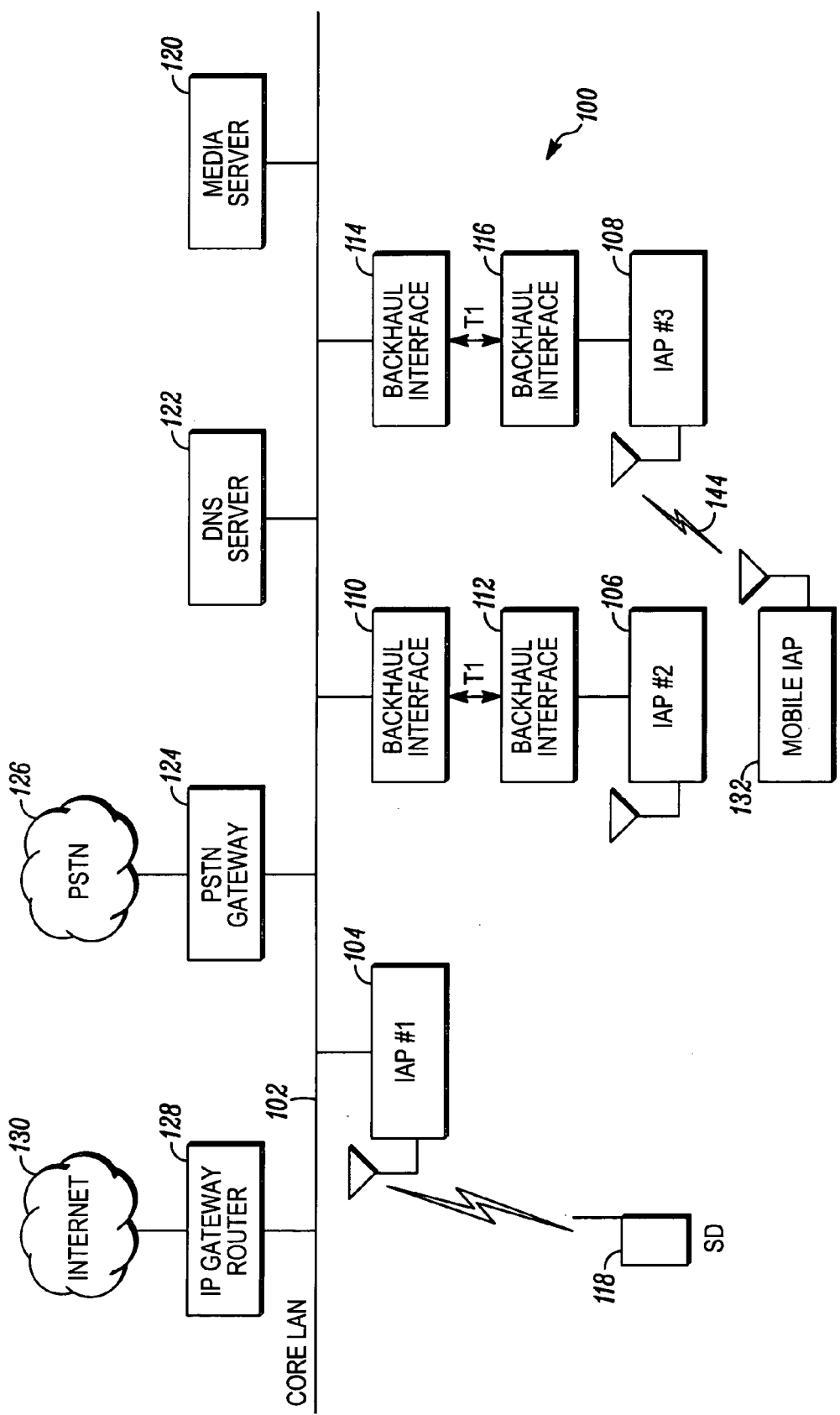
FIG. 1 is a block diagram of an example of a wireless communications network employing mobile access points for providing mobile user terminals with improved access to the network according to an embodiment of the present invention.

FIG. 1 is a block diagram illustrating an example of a wireless communications network 100 employing mobile access terminals according to an embodiment of the present invention. As shown, network 100, which can be referred to as a "core network", includes a core local access network (LAN) 102 which provides the wired infrastructure for the network 100. A plurality of intelligent access points (IAP) 104, 106 and 108 are coupled to and communicate with the core LAN 102. As illustrated in this example, IAP 104 is directly coupled to the core LAN 102, while IAP 106 is coupled to core LAN 102 via backhaul interfaces 110 and 112 and a T1 connection, and IAP 108 is coupled to core LAN 102 via backhaul interfaces 114 and 116 and a T1 connection. However, any suitable backhaul technology, such as T3, fiber and microwave, can be used.

Each IAP 104, 106 and 108 is an infrastructure device containing at least one transceiver and at least one embedded processor. In this example, each IAP 104, 106 and 108 further includes a 10/100 Base-T Ethernet connection. However, the IAPs 104, 106 and 108 can include any type of high-speed connection suitable for coupling to the core LAN 102. An IAP 104, 106 and 108 is configured to remain in a fixed location, such as on a building rooftop or in a building ceiling, and is provided with a permanent source of power, such as alternating current or any other suitable power source.

As described in more detail below, an IAP 104, 106 and 108 operates to provide access for subscriber devices, such as mobile user terminals 118, to wired services provided by the network 100. Each IAP 104, 106 and 108 also provides a respective fixed and known position and location reference, relay and wireless routing for user terminals 118 within its area of coverage, and the principle network management interface with transceivers in wireless routers and subscriber devices, such as user terminals 118. Each wired IAP 104, 106 and 108 can be referred to generally as a "fixed node" on the network 100, while the mobile user terminal 118 can be referred to as a "mobile node". The wired IAP 104, 106 and 108 can also function as access points to the network 100 for user terminals 118 forming an ad-hoc network as described, for example, in U.S. patent No. 7,072,650 entitled "Ad Hoc Peer-to-Peer Mobile Radio Access System Interfaced to the PSTN and Cellular Networks", issued on Jul. 4, 2006, and as in U.S. Pat. No. 5,943,322 to Mayor, the entire contents of each being incorporated by reference herein.

The network 100 further may include a media server 120 for delivering types of media such as video and multimedia data to the core LAN 102, and a domain name server (DNS) 122 for translating Internet domain names into Internet Protocol (IP) addresses in a manner as known in the art. The network 100 may also include a PSTN gateway 124 which provides data access between the network 100 and the PSTN 126, and an IP gateway router 128 which provides data access between the network 100 and the Internet 130.

Further details of the network 100 and its operation will now be described. For purposes of this discussion, the terms "IAP" and "node" or "fixed node" will be used interchangeably, as well as the terms "user terminal" and "mobile node". The wired IAPs 104, 106 and 108 on the core LAN 102 are all fully connected to a single virtual segment. As can be appreciated by one skilled in the art, all IAPs 104, 106 and 108 (fixed nodes) on the virtual segment are directly accessible from any other node at the logical link layer. IP routing is not used to reach any other node on the virtual segment. The IP subnet for this virtual segment is large enough to encompass all of the IAPs 104, 106 and 108, and all mobile nodes 118 in a single broadcast domain. The virtual segment may include media access control layer (MAC-layer) bridges and switches (not shown) between the IAPs 104, 106 and 108, as needed, to filter unicast frames from using bandwidth on non-required links.

The wired IAPs 104, 106 and 108 will, by definition, have two network interfaces, one of which is connected to the network via a wire-line link, and the other being a wireless transceiver. Both of these interfaces will have IP addresses from the core network's IP subnet. An IAP 104, 106 and 108 must then retain an IP routing table indicating that the IP of the wireless transceiver interface is reachable on that interface, while all other IP addresses on that subnet are reachable directly on the wired interface. IP's outside the core network's subnet are reachable via the core network's directly accessible IP router gateway 128.

Figure 2:
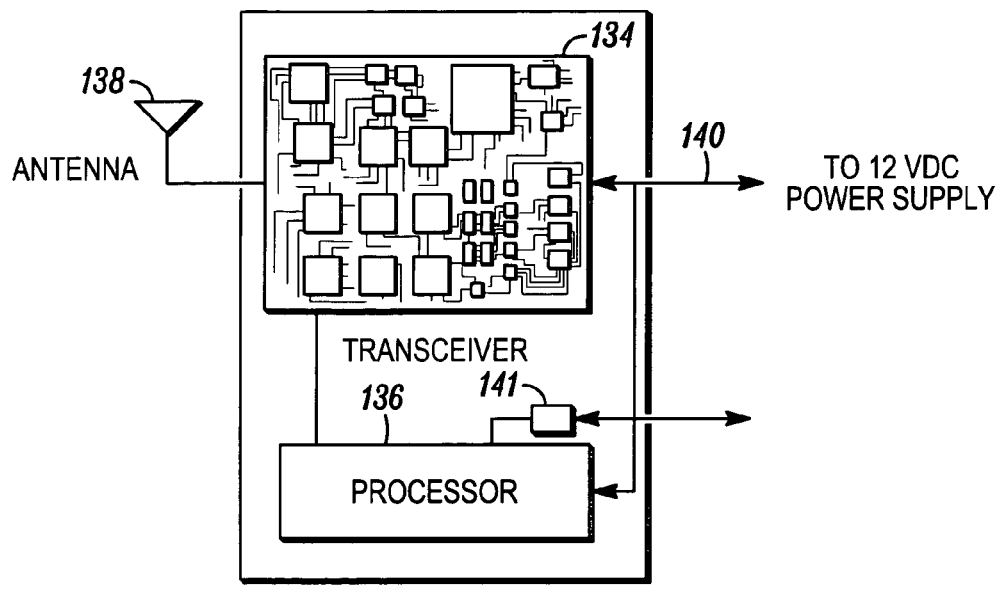
FIG. 2 is a block diagram illustrating an example of a wireless mobile access point of the network shown in FIG. 1 according to an embodiment of the present invention.

In addition to having fixed IAPs 104, 106 and 108, the network can employ mobile IAPs 132. Each mobile IAP 132 is similar to a fixed IAP 104, 106 or 106 in that it operates to provide access for subscriber devices, such as mobile user terminals 118, to wired services provided by the network 100. As shown in FIG. 2, IAP 132 includes at least one transceiver 134 and at least one processor 136. The transceiver 134 can transmit and receive data packets over any frequency band, for example, over the 2 ISM band. However, the frequency and modulation scheme used by the transceiver 134 do not impact the implementation of the mobile IAP 132.

The mobile IAP 132 can be small so as to be mounted on the interior or exterior of a vehicle 146 (see FIG. 4), such as an automobile, truck, bus, train, taxi, police car, fire engine, or any other suitable movable vehicle. For example, the housing of the IAP 132 can be a rectangular box having dimensions of approximately 4 inches by 6 inches by 1 inch. By incorporating such a device in a new automobile up to 15 million could be deployed annually. The mobile IAP 132 further includes an antenna 138 that can be internally or externally mounted to the vehicle 146. This antenna 138 can have a gain higher than that of an antenna typically employed in a mobile user terminal 118.

The mobile IAP 132 further has a connection 140 to a substantially constant external power supply, such as the 12V DC power supply of the vehicle 138. The mobile IAP 132 can further include positioning functionality 141, such as global positioning system (GPS) functionality, differential navigation functionality, or other positioning functionality such as various triangulation techniques as can be appreciated by one skilled in the art, which enables the IAP 132 to know its actual geographic location and to provide this information to the network 100 and to the user terminals 118 using or attempting to use the mobile IAP 132 as their access point to the network 100.

Figure 3:
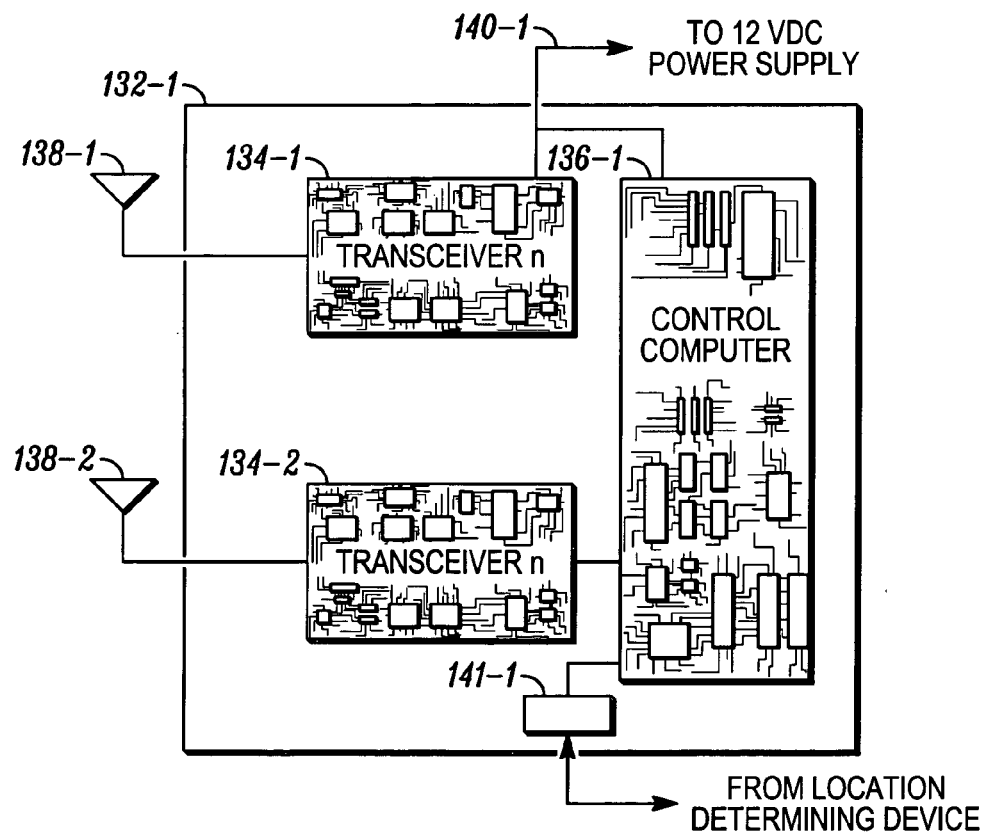
FIG. 3 is a block diagram illustrating another example of a wireless mobile access point of the network shown in FIG. 1 according to another embodiment of the present invention.

FIG. 3 illustrates a higher capacity version of a mobile IAP 132-1 which includes multiple transceivers 134-1 and 134-2 each coupled to a respective antenna 138-1 and 138-2, a single processor 136-1, such as a single board control computer, and a connection 140-1 for connecting to an external power supply, such as the 12 V DC power supply of the vehicle 146. The mobile IAP 132-1 also includes the positioning functionality 141-1 similar to positioning functionality 141 discussed above. The housing of this version of a mobile IAP 132-1 can have dimensions approximately 12 inches by 6 inches by 1 inch, and can be mounted in a larger vehicle such as a city bus or refuse wagon. This higher capacity mobile IAP 132-1 also includes all of the functionality present in mobile IAP 132 as discussed above.

Referring back to FIG. 1, it is noted that each mobile IAP 132 (or 132-1) must be capable of communicating with a fixed IAP via a wireless backhaul 144, such as a microwave backhaul, as can be appreciated by one skilled in the art. In order to minimize the number of fixed IAPs 104, 106 and 108 and mobile IAPs 132 employed in the network 100 while also maximizing the coverage and capacity of the network 100, the fixed IAPs 104, 106 and 108, as well as the mobile IAPs 132, can utilize a self forming self healing radio access technology as described in U.S. patent application Ser. No. 09/897,790 and in U.S. Pat. No. 5,943,322, both referenced above. In addition, all of the fixed IAPs 104, 106 and 108, as well as the mobile IAPs 132 (and 132-1) are capable of performing proxying operations and handoff operations as described in copending U.S. Patent Application Publication US 2003/0091012-A1 of Charles R. Barker, Jr. et al. entitled "System and Method for Providing an Addressing and Proxy Scheme for Facilitating Mobility of Wireless Nodes Between Wired Access Points on a Core Network of a Communications Network", and in a copending U.S. patent application Ser. No. 09/929,031 of Robin U. Roberts et al. entitled "System and Method for Performing Soft Handoff in a Wireless Data Network", both of said patent applications being filed even date herewith, assigned to the assignee of the present application, and the contents of each being incorporated herein by reference. The transceivers 134 (and 134-1 and 134-2) of each mobile IAP 132 (and 132-1) also are capable of performing routing operations as described, for example, in U.S. patent application Ser. No. 09/897,790 and in U.S. Pat. No. 5,943,322, both reference above and incorporated herein by reference.

Figure 4:
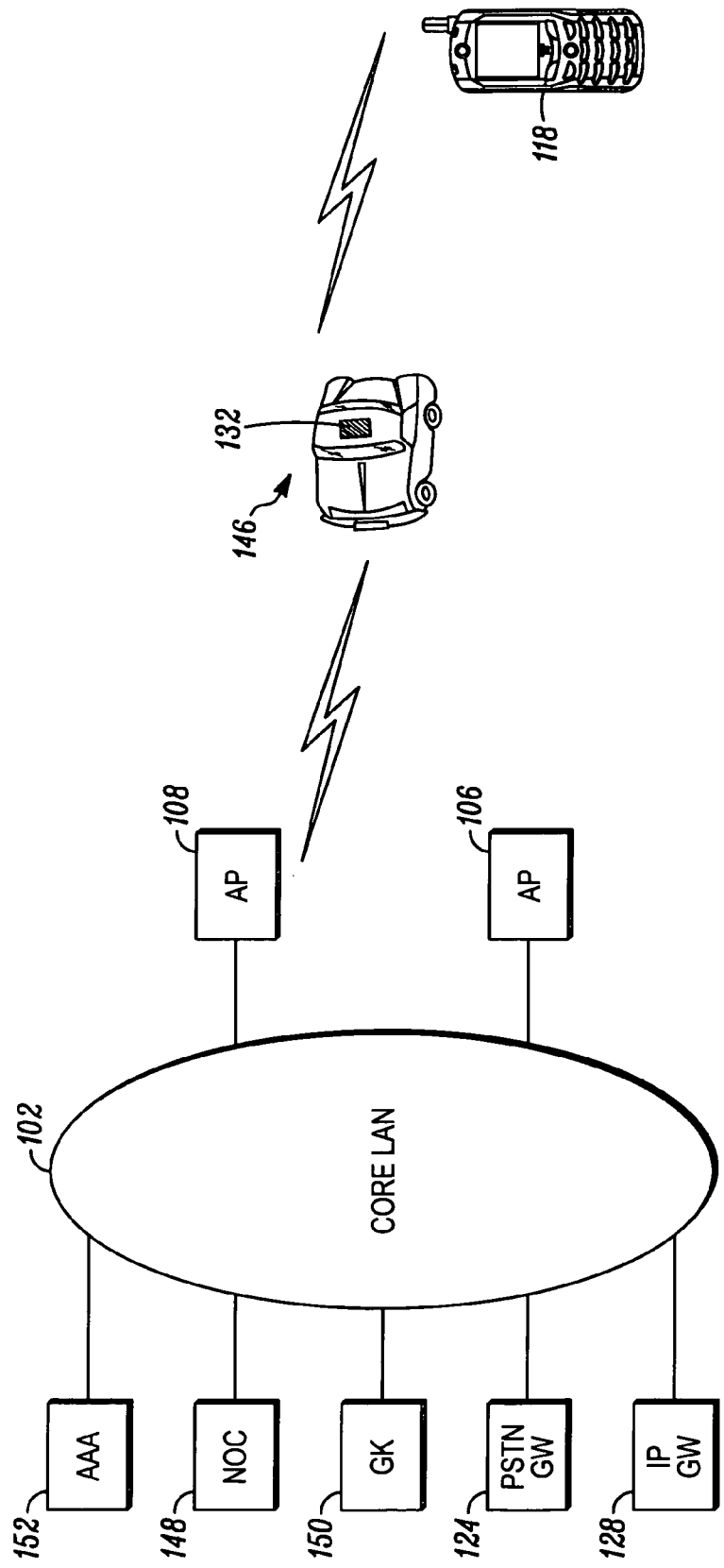
FIG. 4 is a conceptual block diagram illustrating an exemplary manner in which a mobile access point of the network shown in FIG. 1 operates to provide a mobile user terminal access to the network in accordance with an embodiment of the present invention.
Figure 5:
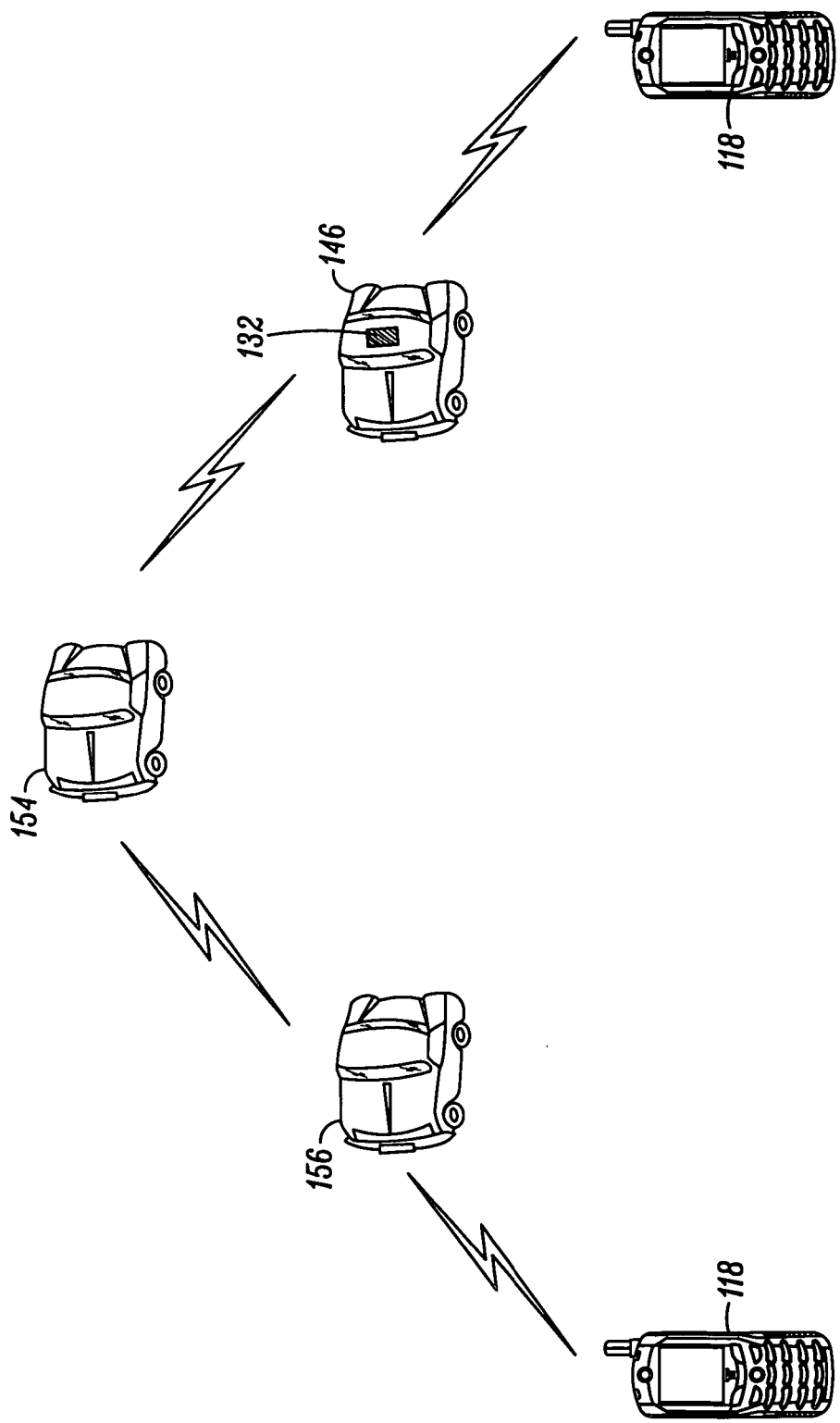
FIG. 5 is a conceptual block diagram illustrating an exemplary manner in which a mobile access point of the network shown in FIG. 1 operates as a link in between mobile user terminals used in the network shown in FIG. 1 in accordance with an embodiment of the present invention.
Figure 6:
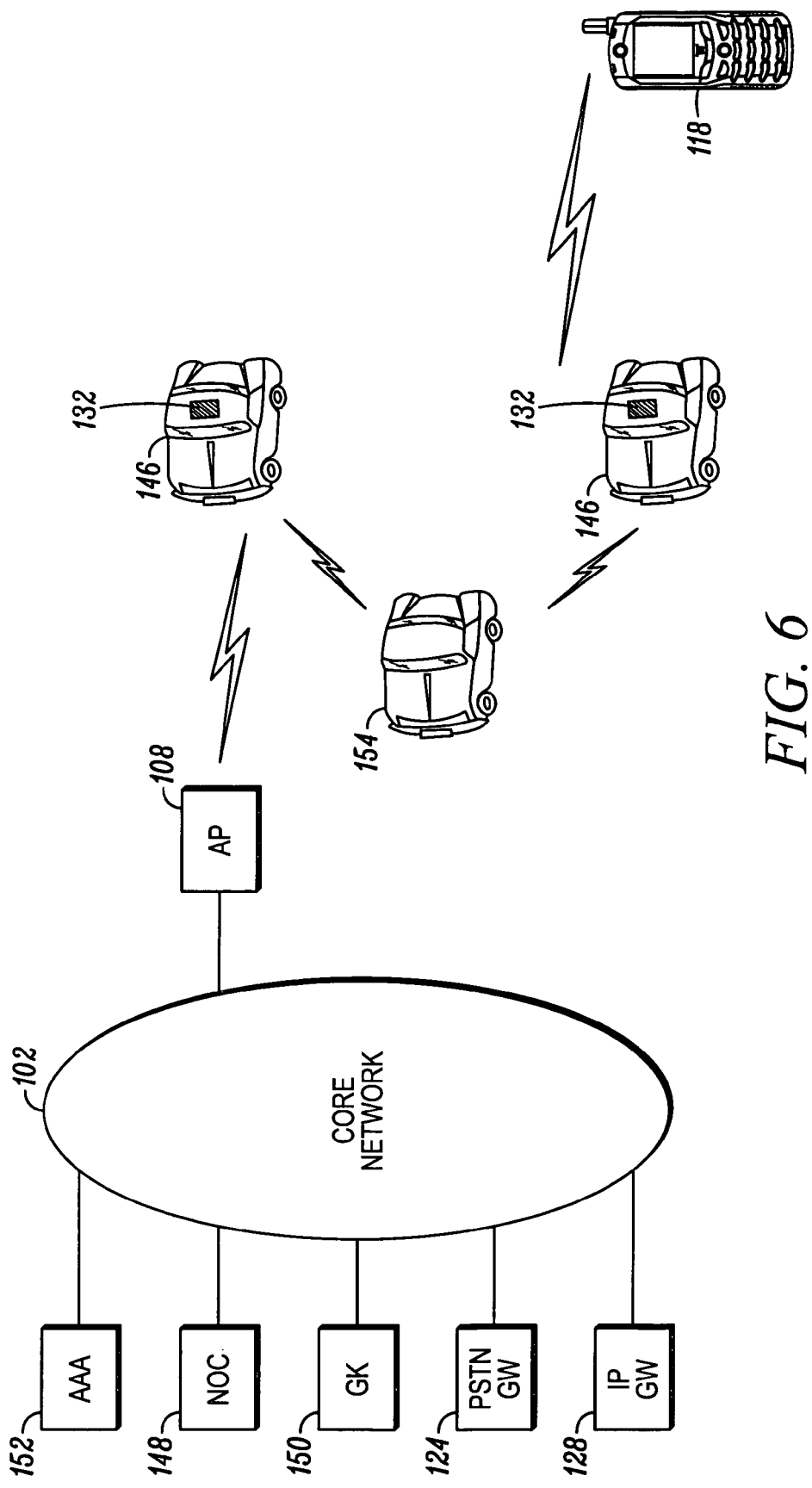
FIG. 6 is a further conceptual block diagram illustrating another exemplary manner in which a mobile access points of the network shown in FIG. 1 operates as a link between mobile user terminals used in the network and to provide those mobile user terminals with access to the network in accordance with an embodiment of the present invention.

Hence, as shown in FIGS. 1 and 4, the mobile IAP 132 can provide a user terminal 118 with access to the network 100 via a fixed IAP, such as fixed IAP 108. It is noted that the conceptual diagram shown in FIG. 4 indicates that the network 100 can also include a network operations center (NOC) 148, a gate keeper (GK) 150, and an authentication/authorization/accounting (AAA) center 152, the purposes of which can be appreciated by one skilled in the art. Furthermore, as shown in FIG. 5, a mobile IAP 132 can operate as a router to enable intercommunication between mobile terminals 118 which can be hand-held or present in other vehicles 154 and 156. In addition, as shown in FIG. 6, the mobile IAPs 132 can use each other in conjunction with another user terminal 118 in the ad-hoc network, such as a user terminal 118 present in a vehicle 154, to connect to a fixed IAP, such as IAP 108. The mobile IAPs 132 can also establish communications links between each other in the ad-hoc network.

Accordingly, the functionality of the mobile IAPs 132 and 132-1 as described above provide a sufficiently mobile infrastructure for the network 100, which minimizes the number of the holes in coverage as well as the amount of time that such holes in coverage exist at any location in the network 100. A user terminal 118 who remains stationary may see the signal quality ebb and flow as this infrastructure moved, but would on average observe acceptable signal levels. Also, as can be appreciated by one skilled in the art, modem existing protocols (such as TCP/IP) can overcome the small periods of time when coverage became unacceptable without breaking the connection or loosing data packets. In addition, due to the self-healing features of the ad-hoc network, the coverage and capacity provided by the mobile IAPs 132 and 132-1 will generally be greatest at the locations with the greatest number of user terminals 118.

Another advantage provided the mobile IAPs 132 and 132-1 is that they can aggregate traffic to the core LAN 102 (see FIG. 1) by concatenating many smaller data packets into larger ones. This technique makes the overall network 100 more efficient. Likewise, the core LAN 102 can aggregate data packets to the mobile IAP 132 or 132-1. The mobile IAP 132 (or 132-1) and core LAN 102 may use the same modulation scheme and frequency as the access network, but are not required to do so if it is determined that a different scheme may be optimal.

Furthermore, if the mobile IAPs 132 or 132-1 are moving at a relatively constant rate and relatively slowly in relation to the mobile user terminals 118, they will have the added benefit of minimizing the Doppler shift issues that plague mobile radio. That is, as can be appreciated by one skilled in the art, Doppler shift issues are more significant for a user terminal 118 travelling at 70 mph with respect to a stationary IAP (e.g., IAP 104, 106 or 108) in comparison to those associated with a user terminal 118 travelling at 70 mph and a mobile IAP 132 or 132-1 which is moving at 35 mph relative to a stationary IAP 104, 106 or 108 and the core LAN 102, because the relative movement between the user terminal 118 and mobile IAP 132 or 132-1 is only 35 mph, and the relative movement between the mobile IAP 132 or 132-1 and the stationary IAP 104, 106 and 108 and core LAN 102 is only 35 mph. Hence, the overall Doppler shift effect is reduced.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A mobile access point, adapted for use with a packet-switched communications network comprising at least one fixed access point, to provide a mobile wireless user terminal with access to the network while said mobile access point is moving, said mobile access point comprising:
   at least one transceiver, adapted to transmit and receive communications signals to and from said wireless user terminal, and including a wireless backhaul, adapted to communicate with said fixed access point to enable said at least one transceiver to operate as a communications link between said wireless user terminal and said fixed access point, to provide said wireless user terminal with access to said network via said communications link while said mobile access point is moving; and
   a structure, adapted to house said at least one transceiver, and being adapted to mount on or in a mobile vehicle,
   wherein the packet-switched communications network includes a wireless ad-hoc peer-to-peer network, and said mobile access point and said at least one fixed access point operate in the wireless ad-hoc peer-to-peer network and communicate with each other via the wireless backhaul.

2. A mobile access point as claimed in claim 1, further comprising:
   a power connection, adapted to couple to a substantially constant power supply, to provide substantially constant power to said transceiver.

3. A mobile access point as claimed in claim 2, wherein:
   said power connection is adapted to coupled to said substantially constant power supply of said vehicle.

4. A mobile access point as claimed in claim 1, wherein:
   said transceiver is further adapted to provide a second communications link between said user terminal an another user terminal.

5. A mobile access point as claimed in claim 1, wherein:
   said transceiver is further adapted to provide a second communications link with another mobile access point adapted for use with said network.

6. A mobile access point as claimed in claim 1, further comprising:
   a location determiner, adapted to determine a geographic location of said mobile access point.

7. A mobile access point as claimed in claim 6, wherein:
   said location determiner includes a global positioning system (GPS) receiver.

8. A method for providing a mobile access point in a packet-switched communications network comprising at least one fixed access point, to provide a mobile wireless user terminal with access to the network, while said mobile access point is moving, said method comprising:
   coupling a mobile access point to a mobile vehicle;
   transmitting and receiving communications signals between said mobile access point and said wireless user terminal while said mobile access point is moving; and
   establishing a communications link between said mobile access point and said fixed access point via a wireless backhaul, such that said communications link provides said wireless user terminal access to said network via said fixed access point while said mobile access point is moving,
   wherein the packet-switched communications network includes a wireless ad-hoc peer-to-peer network, and said mobile access point and said at least one fixed access point operate in the wireless ad-hoc peer-to-peer network and communicate with each other via the wireless backhaul.

9. A method as claimed in claim 8, further comprising:
   providing substantially constant power to said mobile access point.

10. A method as claimed in claim 9, wherein:
    said providing provides said substantially constant power from a power supply of said vehicle.

11. A method as claimed in claim 8, further comprising:
    using said mobile access point to provide a second communications link between said user terminal and another user terminal.

12. A method as claimed in claim 8, further comprising:
    providing a second communications link between said mobile access point and another mobile access point adapted for use with said network.

13. A method as claimed in claim 8, further comprising:
    determining a geographic location of said mobile access point.

14. A method as claimed in claim 13, wherein:
    said location determining includes using global positioning system (GPS) technology to determine said geographic location of said mobile access point.

15. A mobile access point, adapted for use with a packet-switched communications network comprising at least one fixed access point, to provide a mobile wireless user terminal with access to the network, said mobile access point comprising:
    at least one transceiver, adapted to transmit and receive communications signals to and from said wireless user terminal, and to operate as a communications link between said wireless user terminal and said fixed access point, to provide said wireless user terminal with access to said network via said communications link;
    a structure, adapted to house said at least one transceiver, and being adapted to mount on or in a mobile vehicle; and
    a power connection, adapted to couple to a substantially constant power supply of said vehicle, to provide substantially constant power to said transceiver,
    wherein the packet-switched communications network includes a wireless ad-hoc peer-to-peer network, and said mobile access point and said at least one fixed access point operate in the wireless ad-hoc peer-to-peer network and communicate with each other via the wireless backhaul.

16. A method for providing a mobile access point in a packet-switched communications network comprising at least one fixed access point, to provide a mobile wireless user terminal with access to the network, said method comprising:
    coupling a mobile access point to a mobile vehicle; and
    transmitting and receiving communications signals between said mobile access terminal and said wireless user terminal;
    establishing a communications link between said mobile access terminal and said fixed access point, such that said communications link provides said wireless user terminal access to said network via said fixed access point; and
    providing substantially constant power to said mobile access point from a power supply of said vehicle, wherein the packet-switched communications network includes a wireless ad-hoc peer-to-peer network, and said mobile access point and said at least one fixed access point operate in the wireless ad-hoc peer-to-peer network and communicate with each other via the wireless backhaul.

17. A mobile access point, adapted for use with a packet-switched communications network comprising at least one fixed access point, to provide a mobile wireless user terminal with access to the network while said mobile access point is moving, said mobile access point comprising:
at least one transceiver, adapted to transmit and receive communications signals to and from said wireless user terminal, and including a wireless backhaul comprising a microwave backhaul, said wireless backhaul adapted to communicate with said fixed access point to enable said at least one transceiver to operate as a communications link between said wireless user terminal and said fixed access point, to provide said wireless user terminal with access to said network via said communications link while said mobile access point is moving; and
a structure, adapted to house said at least one transceiver, and being adapted to mount on or in a mobile vehicle.

18. A mobile access point as claimed in claim 1, comprising a plurality of said transceivers, each comprising a respective wireless backhaul and being adapted to communicate with at least one of said fixed access points via its respective wireless backhaul.

19. A method for providing a mobile access point in a packet-switched communications network comprising at least one fixed access point, to provide a mobile wireless user terminal with access to the network while said mobile access point is moving, said method comprising:
coupling a mobile access point to a mobile vehicle;
transmitting and receiving communications signals between said mobile access point and said wireless user terminal while said mobile access point is moving; and
establishing a communications link between said mobile access point and said fixed access point via a wireless backhaul, wherein said wireless backhaul includes a microwave backhaul, such that said communications link provides said wireless user terminal access to said network via said fixed access point while said mobile access point is moving.

20. A method as claimed in claim 8, further comprising: establishing a second communications link between said mobile access point and another said fixed access point via another wireless backhaul, such that said second communications link provides another wireless user terminal access to said network via said another fixed access point while said mobile access point is moving.

21. A mobile access point, adapted for use with a packet-switched communications network comprising at least one fixed access point, to provide a mobile wireless user terminal with access to the network while said mobile access point is moving, said mobile access point comprising:
at least one transceiver, adapted to transmit and receive communications signals to and from said wireless user terminal, and to operate as a communications link between said wireless user terminal and said fixed access point, to provide said wireless user terminal with access to said network via said communications link while said mobile access point is moving;
a structure, adapted to house said at least one transceiver, and being adapted to mount on or in a mobile vehicle; and a power connection, adapted to couple to a substantially constant power supply of said vehicle, to provide substantially constant power to said transceiver,
wherein the packet-switched communications network includes a wireless ad-hoc peer-to-peer network, and said mobile access point and said at least one fixed access point operate in the wireless ad-hoc peer-to-peer network and communicate with each other via the wireless backhaul.

22. A mobile access point, adapted for use with a packet-switched communications network comprising at least one fixed access point, to provide a mobile wireless user terminal with access to the network while said mobile access point is moving, said mobile access point comprising:
at least one transceiver, adapted to transmit and receive communications signals to and from said wireless user terminal, and to operate as a communications link between said wireless user terminal and said fixed access point, to provide said wireless user terminal with access to said network via said communications link while said mobile access point is moving; and
a structure, adapted to house said at least one transceiver, and being adapted to mount on or in a mobile vehicle; and
wherein said transceiver is further adapted to provide a second communications link between said user terminal and another user terminal,
wherein the packet-switched communications network includes a wireless ad-hoc peer-to-peer network, and said mobile access point and said at least one fixed access point operate in the wireless ad-hoc peer-to-peer network and communicate with each other via the wireless backhaul.

23. A method for providing a mobile access point in a packet-switched communications network comprising at least one fixed access point, to provide a mobile wireless user terminal with access to the network while said mobile access point is moving, said method comprising:
coupling a mobile access point to a mobile vehicle;
transmitting and receiving communications signals between said mobile access terminal and said wireless user terminal while said mobile access point is moving;
establishing a communications link between said mobile access terminal and said fixed access point, such that said communications link provides said wireless user terminal access to said network via said fixed access point while said mobile access point is moving; and
providing substantially constant power to said mobile access point from a power supply of said vehicles,
wherein the packet-switched communications network includes a wireless ad-hoc peer-to-peer network, and said mobile access point and said at least one fixed access point operate in the wireless ad-hoc peer-to-peer network and communicate with each other via the wireless backhaul.

24. A method for providing a mobile access point in a packet-switched communications network comprising at least one fixed access point, to provide a mobile wireless user terminal with access to the network while said mobile access point is moving, said method comprising:
coupling a mobile access point to a mobile vehicle;
transmitting and receiving communications signals between said mobile access terminal and said wireless user terminal while said mobile access point is moving;

establishing a communications link between said mobile access terminal and said fixed access point, such that said communications link provides said wireless user terminal access to said network via said fixed access point while said mobile access point is moving; and using said mobile access point to provide a second communications link between said user terminal and another user terminal, wherein the packet-switched communications network includes a wireless ad-hoc peer-to-peer network, and said mobile access point and said at least one fixed access point operate in the wireless ad-hoc peer-to-peer network and communicate with each other via the wireless backhaul.

\* \* \* \* \*